(12) United States Patent
Chen

(10) Patent No.: US 10,978,019 B2
(45) Date of Patent: Apr. 13, 2021

(54) HEAD MOUNTED DISPLAY SYSTEM SWITCHABLE BETWEEN A FIRST-PERSON PERSPECTIVE MODE AND A THIRD-PERSON PERSPECTIVE MODE, RELATED METHOD AND RELATED NON-TRANSITORY COMPUTER READABLE STORAGE MEDIUM

(71) Applicant: XRSpace CO., LTD., Taoyuan (TW)

(72) Inventor: Wei-Shuo Chen, Kaohsiung (TW)

(73) Assignee: XRSpace CO., LTD., Taoyuan (TW)

( * ) Notice: Subject to any disclaimer, the term of this patent is extended or adjusted under 35 U.S.C. 154(b) by 0 days.

(21) Appl. No.: 16/384,894

(22) Filed: Apr. 15, 2019

(65) Prior Publication Data
US 2020/0327860 A1  Oct. 15, 2020

(51) Int. Cl.
*G09G 5/00* (2006.01)
*G06F 3/01* (2006.01)

(52) U.S. Cl.
CPC ............ *G09G 5/003* (2013.01); *G06F 3/012* (2013.01); *G06F 3/017* (2013.01); *G09G 2354/00* (2013.01)

(58) Field of Classification Search
None
See application file for complete search history.

(56) References Cited

U.S. PATENT DOCUMENTS

| 9,566,509 | B2 | 2/2017 | Paquet | |
|---|---|---|---|---|
| 2011/0227913 | A1* | 9/2011 | Hyndman | A63F 13/10 345/419 |
| 2011/0244957 | A1* | 10/2011 | Nishimura | A63F 13/5258 463/31 |

(Continued)

FOREIGN PATENT DOCUMENTS

| EP | 2 374 514 A2 | 10/2011 |
|---|---|---|
| EP | 2 374 514 A3 | 10/2013 |

(Continued)

OTHER PUBLICATIONS

Anonymous, What Are the Differences Between First-Person Shooter and Third-Person Shooter Games?, Jul. 24, 2013, pp. 1-4, ebay, XP055331926.

(Continued)

*Primary Examiner* — Benjamin X Casarez
(74) *Attorney, Agent, or Firm* — Winston Hsu

(57) ABSTRACT

A head mounted display system is switchable between a first-person perspective mode and a third-person perspective mode. The head mounted display system includes a wearable body, a display unit and a processing unit. The display unit is for displaying a scene in the first-person perspective mode or in the third-person perspective mode. The processing unit is configured to generate a switching command in response to an activating command, so as to indicate the display unit to switch from the first-person perspective mode to the third-person perspective mode, or to switch from the third-person perspective mode to the first-person perspective mode, which allows the user get away from a stopping state or a stuck state, or understand a current position or a current state in the virtual environment, which significantly enhances user experience.

20 Claims, 12 Drawing Sheets

(56) References Cited

U.S. PATENT DOCUMENTS

| | | | |
|---|---|---|---|
| 2014/0125698 A1* | 5/2014 | Latta | G06F 3/011 345/633 |
| 2014/0160129 A1* | 6/2014 | Sako | H04N 5/225 345/427 |
| 2014/0186002 A1* | 7/2014 | Hanaya | G06F 3/017 386/200 |
| 2016/0054837 A1 | 2/2016 | Stafford | |
| 2016/0195940 A1* | 7/2016 | Hall | A63F 13/428 345/158 |
| 2017/0109936 A1 | 4/2017 | Powderly | |
| 2018/0005431 A1* | 1/2018 | Yoshioka | G06F 3/012 |
| 2018/0165864 A1* | 6/2018 | Jin | G06F 3/017 |
| 2018/0288391 A1 | 10/2018 | Lee | |
| 2018/0341386 A1* | 11/2018 | Inomata | G06T 13/40 |

FOREIGN PATENT DOCUMENTS

| | | |
|---|---|---|
| JP | 2014-12397 A | 1/2014 |
| JP | 2014-115457 A | 6/2014 |
| JP | 2014-127987 A | 7/2014 |
| JP | 2018-13562 A | 1/2018 |
| JP | 2018-508805 A | 3/2018 |
| JP | 2018-109835 A | 7/2018 |
| JP | 6434667 B1 | 12/2018 |
| JP | 2019-40555 A | 3/2019 |
| JP | 2019-80742 A | 5/2019 |
| WO | 2019/012817 A1 | 1/2019 |

OTHER PUBLICATIONS

Office action dated Jun. 9, 2020 for the Taiwan application No. 108117407, filing date May 21, 2019, pp. 1-10.

Search Report dated Oct. 28, 2019 for EP application No. 19171728. 9, pp. 1-9.

Mogura VR (Sunkubo (Shun Kubota)), What is Omni that can run in VR? Price, performance, experience report summary, published online on Jan. 11, 2016, retrieved on Aug. 6, 2020 from the Internet URL: https://www.moguravr.com/virtux-omni-matome/.

Office Action dated Jul. 28, 2020 for the Japanese Application No. 2019-089490, filing date May 10, 2019, pp. 1-4.

* cited by examiner

HEAD MOUNTED DISPLAY SYSTEM SWITCHABLE BETWEEN A FIRST-PERSON PERSPECTIVE MODE AND A THIRD-PERSON PERSPECTIVE MODE, RELATED METHOD AND RELATED NON-TRANSITORY COMPUTER READABLE STORAGE MEDIUM

BACKGROUND OF THE INVENTION

1. Field of the Invention

The present disclosure relates to a head mounted display system, a related method and a related non-transitory computer readable storage medium, and more particularly, to a head mounted display system switchable between a first-person perspective mode and a third-person perspective mode, a related method and a related non-transitory computer readable storage medium.

2. Description of the Prior Art

With the advancement and development of technology, the demand of interactions between a computer game and a user is increased. Human-computer interaction technology, e.g. somatosensory games, virtual reality (VR) environment, augmented reality (AR) environment, mixed reality (MR) environment and extended reality (XR) environment, becomes popular because of its physiological and entertaining function. In order to enhance immersive experience of the human-computer interaction technology, a conventional display apparatus, such as a head mounted display (HMD), usually displays a scene from a first-person perspective. However, sometimes the user gets confused easily because the scene from the first-person perspective does not allow the user to understand a current position or a current state of an avatar in a virtual environment, which results in inconvenience in the immersive experience.

SUMMARY OF THE INVENTION

Therefore, it is an objective of the present disclosure to provide a head mounted display system switchable between a first-person perspective mode and a third-person perspective mode, a related method and a related non-transitory computer readable storage medium for solving the aforementioned problems.

In order to achieve the aforementioned objective, the present disclosure discloses a head mounted display system. The head mounted display system includes a wearable body, a display unit and a processing unit. The wearable body is configured to be worn by a user. The display unit is mounted on the wearable body and configured to display a scene in a first-person perspective mode or in a third-person perspective mode. The processing unit is coupled to the display unit and configured to generate a switching command in response to an activating command. The switching command indicates the display unit to switch from the first-person perspective mode to the third-person perspective mode, or to switch from the third-person perspective mode to the first-person perspective mode.

In order to achieve the aforementioned objective, the present disclosure further discloses a method of switching a head mounted display system between a first-person perspective mode and a third-person perspective mode. The method includes utilizing a display unit of the head mounted display system to display a scene in the first-person perspective mode or in the third-person perspective mode; and utilizing a processing unit of the head mounted display system to generate a switching command in response to an activating command to indicate the display unit to switch from the first-person perspective mode to the third-person perspective mode, or to switch from the third-person perspective mode to the first-person perspective mode.

In order to achieve the aforementioned objective, the present disclosure further discloses a non-transitory computer readable storage medium storing a program that causes a head mounted display system to execute a process. The process includes utilizing a display unit of the head mounted display system to display a scene in a first-person perspective mode or in a third-person perspective mode; and utilizing a processing unit of the head mounted display system to generate a switching command in response to an activating command to indicate the display unit to switch from the first-person perspective mode to the third-person perspective mode, or to switch from the third-person perspective mode to the first-person perspective mode.

In summary, the present disclosure utilizes the processing unit for generating the switching command in response to the activating command to indicate the display unit to switch between the first-person perspective mode and the third-person perspective mode. Therefore, it allows a user to switch the display unit between the first-person perspective mode and the third-person perspective mode by different ways to, for example, help the user to get away from a stopping state or a stuck state of the avatar played by the user, or to understand a current position or a current state of the avatar played by the user in a virtual environment, which significantly enhances user experience.

These and other objectives of the present disclosure will no doubt become obvious to those of ordinary skill in the art after reading the following detailed description of the preferred embodiment that is illustrated in the various figures and drawings.

DETAILED DESCRIPTION

Figure 1:
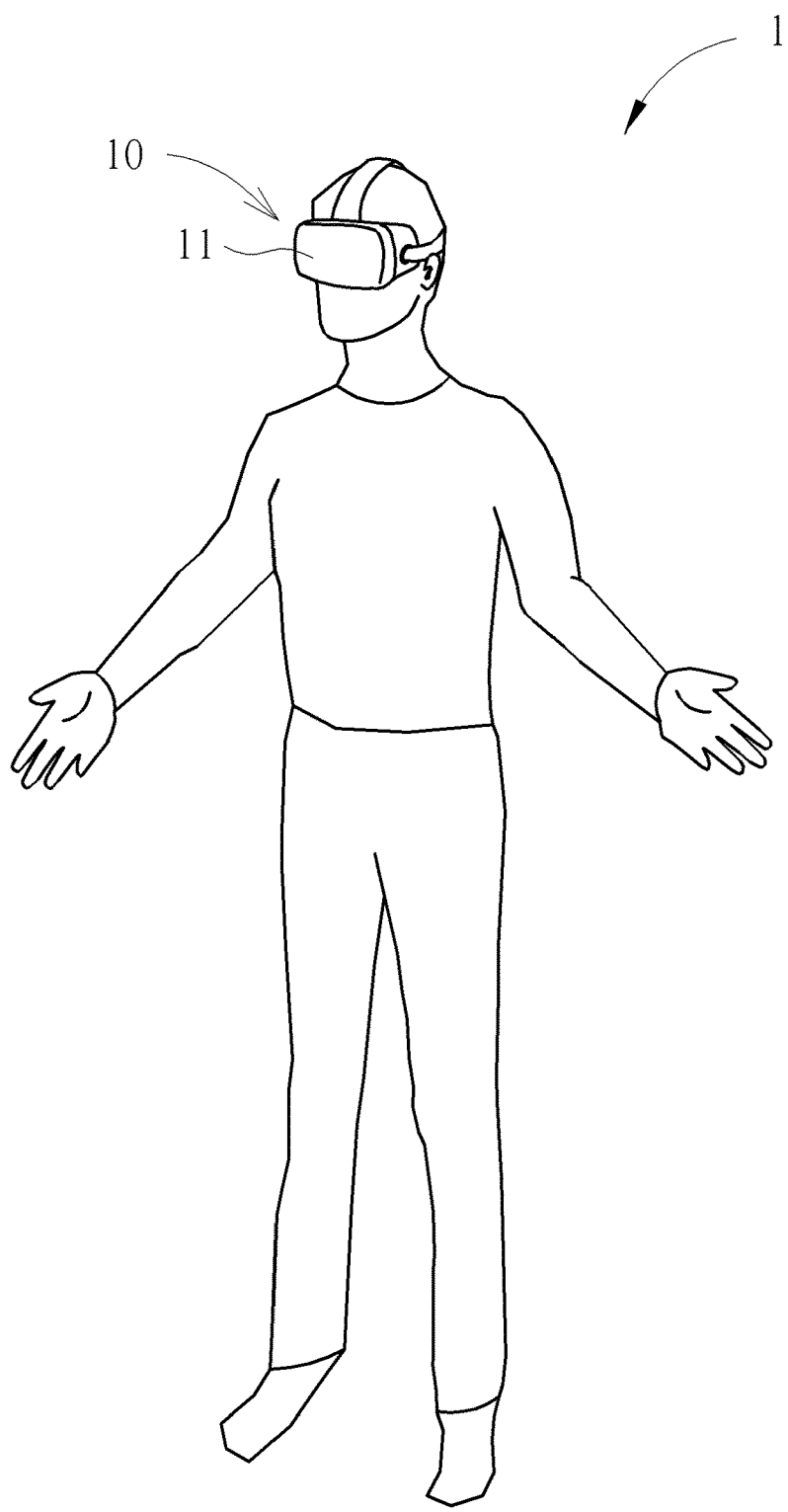
FIG. 1 is a diagram of a head mounted display system according to a first embodiment of the present disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . " In addition, to simplify the descriptions and make it more convenient to compare between each embodiment, identical components are marked with the same reference numerals in each of the following embodiments. Please note that the figures are only for illustration and the figures may not be to scale. Also, the term "couple" is intended to mean either an indirect or direct electrical/mechanical connection. Thus, if a first device is coupled to a second device, that connection may be through a direct electrical/mechanical connection, or through an indirect electrical/mechanical connection via other devices and connections.

Figure 2:
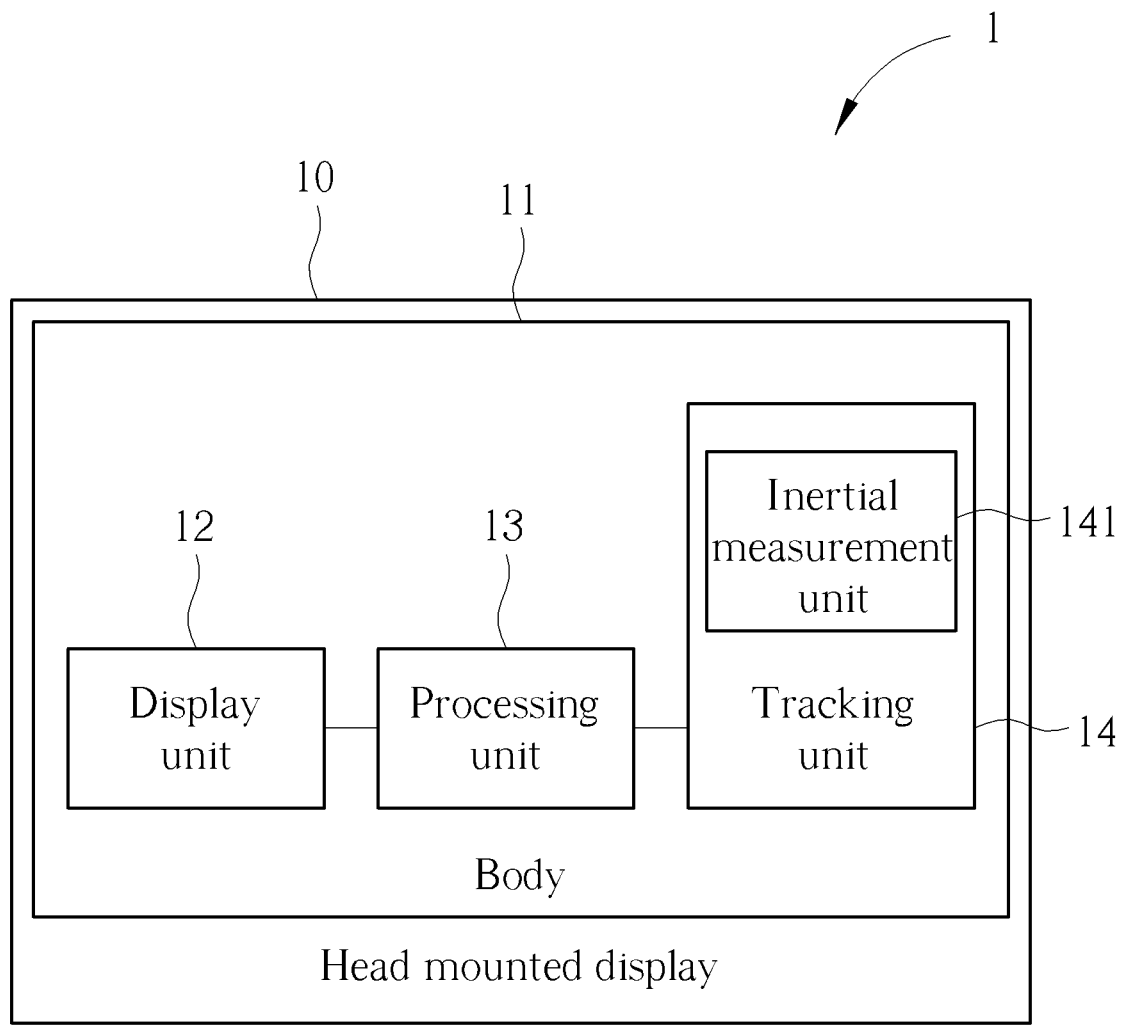
FIG. 2 is a functional block diagram of the head mounted display system according to the first embodiment of the present disclosure.

Please refer to FIG. 1 and FIG. 2. FIG. 1 is a diagram of a head mounted display system 1 according to a first embodiment of the present disclosure. FIG. 2 is a functional block diagram of the head mounted display system 1 according to the first embodiment of the present disclosure. As shown in FIG. 1 and FIG. 2, the head mounted display system 1 includes a wearable body 11, which can be worn by a user, a display unit 12, a processing unit 13 and a tracking unit 14.

The display unit 12 can be mounted on a surface of the wearable body 11. The display unit 12 is configured to display a scene of a virtual environment to the user in a first-person perspective mode or in a third-person perspective mode. The display unit 12 can switch from the first-person perspective mode to the third-person perspective mode, and/or to switch from the third-person perspective mode to the first-person perspective mode. In this embodiment, the display unit 12 can be a liquid crystal display (LCD), light-emitting diode (LED) display, an organic light-emitting diode (OLED) display, or any other display. However, the present disclosure is not limited thereto.

The processing unit 13 can be mounted inside the wearable body 11 and coupled to the display unit 12. The processing unit 13 is configured to process data of the display unit 12 and further to generate a switching command in response to an activating command. The switching command indicates the display unit 12 to switch from the first-person perspective mode to the third-person perspective mode, and/or to switch from the third-person perspective mode to the first-person perspective mode. The switching command can be transmitted to a CPU, a GPU, an image processing unit, another part of the processing unit 13 or directly to the display unit 12. In this embodiment, the processing unit 13 can be implemented in software, firmware, hardware configuration, or a combination thereof. For example, the processing unit 13 can be a processor, such as a central processing unit, an application processor, a microprocessor, etc., or may be realized by an application specific integrated circuit (ASIC). However, the present disclosure is not limited thereto.

The tracking unit 14 is configured to track a position, an orientation or a pose of the head mounted display system 1. In this embodiment, the tracking unit 14 can include an inertial measurement unit (IMU) 141 mounted inside the wearable body 11, such as a gyroscope, an accelerometer, a magnetic sensor or a combination thereof, for tracking a position, an orientation or a pose of the wearable body 11 to determine the position, the orientation or the pose of the head mounted display system 1. However, the present disclosure is not limited to this embodiment. The inertial measurement unit can be mounted on a component another than the wearable body.

For example, in another embodiment, the tracking unit 14 can further include a hand sensor, a lower body sensor or an external camera module, and the inertial measurement unit can be mounted the hand sensor, the lower body sensor or the external camera module, for tracking a position, an orientation or a pose of the hand senor, the lower body sensor or the external camera module to determine the position, the orientation or the pose of the head mounted display system 1.

In this embodiment, the tracking unit 14 is configured to collect data for determining generation of the activating command. For example, the activating command can be generated when a tracking result of the tracking unit 14 meets a predetermined condition. However, determination of generation of the activating command is not limited to this embodiment. In another embodiment, which will be described later, the data collected from the tracking unit 14 may not be used to determine generation of the activating command.

Furthermore, in this embodiment, the determination of the generation of the activating command and the generation of the activating command can be performed by the tracking unit. However, the present disclosure is not limited thereto. In another embodiment, the tracking unit can transmit the collected data or the tracking result to the processing unit, and the determination of the generation of the activation command and the generation of the activating command can be performed by processing unit.

Besides, in this embodiment, the display unit 12, the processing unit 13, and the tracking unit 14 are disposed on the wearable body 11. However, the present disclosure is not limited to this embodiment. For example, in another embodiment, the head mounted display system further includes a remote computing apparatus disposed away from the wearable body separately and a communication module disposed on the wearable body for constructing a communication channel to the remote computing apparatus. The remote computing apparatus can be an edge computing device, a cloud computing device, a local host computer, a remote sever, a smartphone, or the like. The communication module can establish a wired connection or a wireless connection between elements on the wearable body and elements on the remote computing apparatus. In this embodiment, the processing unit or the tracking unit can be at least partly disposed on the remote computing apparatus other than the wearable body and/or distributes part of the tasks to the remote computing apparatus, so that the remote computing apparatus can receive the tracking result of the tracking unit or transmit the activating command or the switching command via the communication module, so as to reduce the size and calculation of the wearable body, which makes the wearable body be lightweight and portable.

Figure 3:
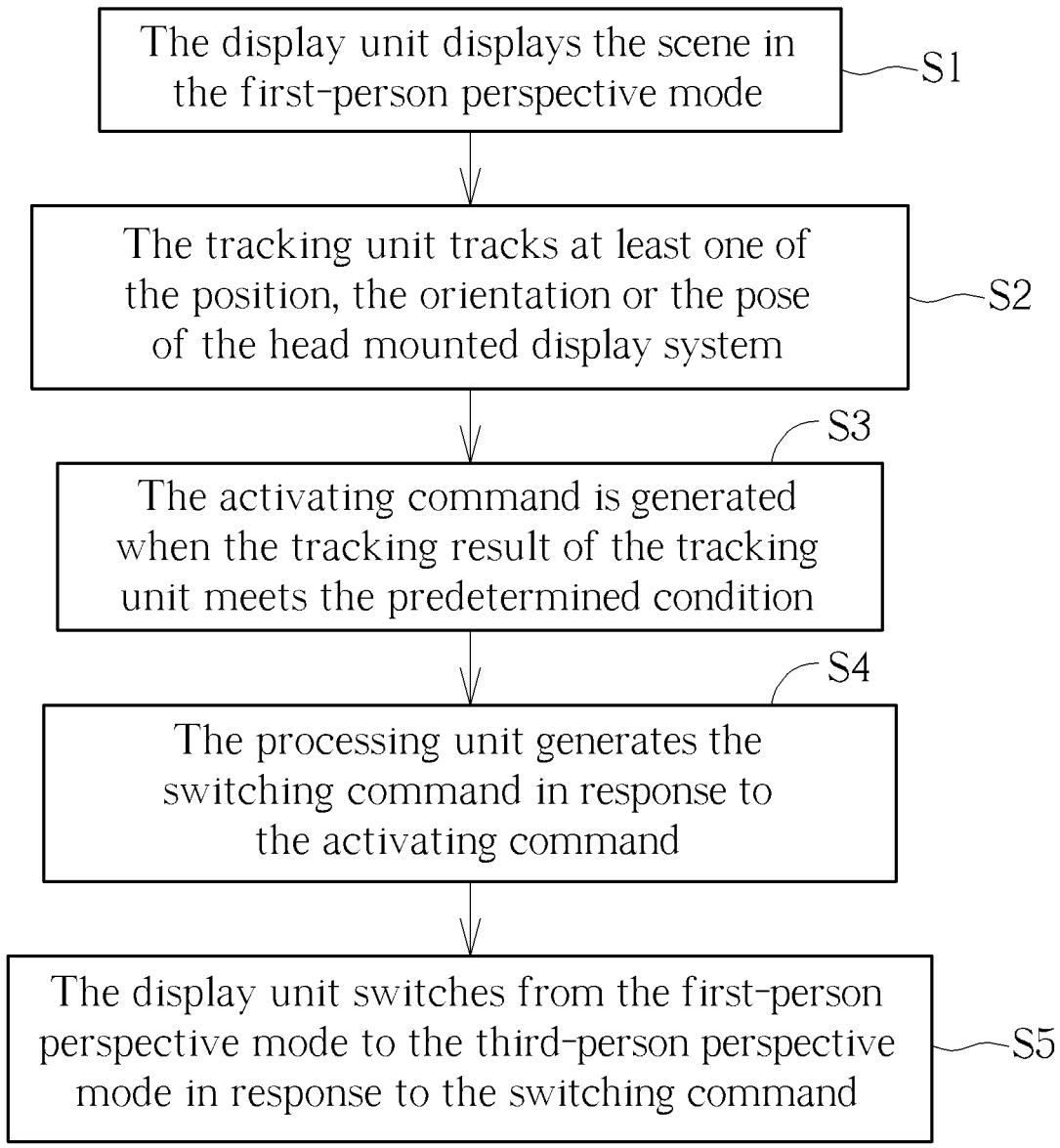
FIG. 3 is a flow chart diagram illustrating a method of switching the head mounted display system between a first-person perspective mode and a third-person perspective mode according to the first embodiment of the present disclosure.

Please refer to FIG. 3. FIG. 3 is a flow chart diagram illustrating a method of switching the head mounted display system 1 between the first-person perspective mode and the third-person perspective mode according to the first embodiment of the present disclosure. As shown in FIG. 3, the method includes the following steps:

S1: The display unit 12 displays the scene in the first-person perspective mode.

S2: The tracking unit 14 tracks at least one of the position, the orientation and the pose of the head mounted display system 1.

S3: The activating command is generated when the tracking result of the tracking unit 14 meets the predetermined condition.

S4: The processing unit 13 generates the switching command in response to the activating command.

S5: The display unit 12 switches from the first-person perspective mode to the third-person perspective mode in response to the switching command.

Detailed description for the steps is provided as follows. In step S1, there can be a virtual camera for capturing images of the virtual environment, and the pose, the position and the orientation of the virtual camera and an eye of an avatar played by the user can be determined based on the pose, the position and the orientation of the head mounted display system 1. Therefore, when the user wears the wearable body 11, the display unit 12 can display the scene in the first-person perspective mode for the user firstly according to the images captured by the virtual camera.

In steps S2 and S3, when the user experiences the virtual environment, the tracking unit 14 can track at least one of the position, the orientation and the pose of the head mounted display system 1 by tracking at least one of the position, the orientation and the pose of the wearable body 11. Furthermore, the activating command is generated when the tracking result of the tracking unit 14 meets the predetermined condition.

In this embodiment, the predetermined condition may be determined according to a relation between the head mounted display system 1 and the avatar played by the user. For example, the predetermined condition can refer to that a difference between a reference position, e.g., an eye position, of the avatar in the virtual environment and a reference position, e.g., a view position, of the head mounted display system 1 in the virtual environment, which is generated according to the position of the wearable body 11 in the real environment and can be a position of the virtual camera, is greater than a predetermined difference.

In detailed, when the avatar played by the user is stopped by or get stuck by an obstruction in the virtual environment, such as a virtual wall, however, the user still keeps moving forward in the real environment, and therefore, the view position of the head mounted display system 1, i.e., the virtual camera, in the virtual environment moves forward along with the forward movement of wearable body 11 in the real environment, which results in inconsistent operation of the user and the avatar played by the user because the eye position of the avatar in the virtual environment does not move. At this moment, the reference position, e.g., the eye position, of the avatar in the virtual environment horizontally departs from the reference position, e.g., the view position, of the head mounted display system 1, i.e., the virtual camera, in the virtual environment, and the activating command is generated when a horizontal difference between the reference position of the avatar in the virtual environment and the reference position of the head mounted display system 1 in the virtual environment is greater than the predetermined difference.

Alternatively, when the avatar is controlled to sit on a virtual chair in the virtual environment, however, the user still keeps standing in the real environment, and therefore, the view position of the head mounted display system 1, i.e., the virtual camera, in the virtual environment does not move downwardly along with the eye position of the avatar. At this moment, the reference position, e.g., the eye position, of the avatar in the environment vertically departs from the reference position, e.g., the view position, of the head mounted display system 1, i.e., the virtual camera, in the virtual environment, and the activating command is generated when a vertical difference between the reference position of the avatar in the environment and the reference position of the head mounted display system 1 in the virtual environment is greater than the predetermined difference.

Furthermore, in a preferred embodiment, the display information of the display unit can be used to determine whether to determine the tracking result of the tracking unit meets the predetermined condition. For example, when the display unit displays the scene normally, it may mean the avatar is in a normal state, and there is no need to determine whether the tracking result of the tracking unit meets the predetermined condition for switching the display unit. On the other hand, when the display unit cannot display the scene normally, e.g., the display unit displays a black or blank screen, it may mean the avatar is in a stopping state or a stuck state, and there is a need to compare the tracking result of the tracking unit with the predetermined condition to determine whether the tracking result of the tracking unit meets the predetermined condition the predetermined condition for switching the display unit.

However, the predetermined condition is not limited thereto. In another embodiment, the pose, the position and the orientation of the virtual camera can be determined based on the position, the orientation and the pose of the eye of the avatar, and the predetermined condition can refer to that a difference between the orientation of the eye of avatar and the orientation of the wearable body is greater than a predetermined difference. For example, the orientation of the eye of the avatar can be represented as (0 degrees, 0 degrees, 0 degrees) when the eye of the avatar looks directly at the floor of the virtual environment and can be represented as (0 degrees, 0 degrees, 180 degrees) when the eye of the avatar looks directly at the ceiling of the virtual environment. However, in the same time, the eye of the user looks forward, and the orientation of the wearable body can be represented as (0 degrees, 0 degrees, 90 degrees), which causes a difference (e.g. 90 degrees) between the orientation of the eye of the avatar and the orientation of the wearable body and results in inconsistency because the orientation of the virtual camera is different from the orientation of the wearable body. Accordingly, the activating command can be generated when the difference is greater than the predetermined difference.

Alternatively, in another embodiment, the predetermined condition can refer to a predetermined orientation or a predetermined pose of the head mounted display system, and the activating command can be generated when the orientation or the pose of the head mounted display system tracked by the tracking unit meets the predetermined orientation or the predetermined pose.

Alternatively, in another embodiment, which will be described later, the tracking unit can further include a camera module, a hand sensor worn on a hand of the user, a lower body sensor worn on a lower body of the user, or a combination thereof for determining a hand gesture of the user, a hand movement of the user or a lower body movement of the user, and the predetermined condition can refer to a predetermined hand gesture, a predetermined hand movement, a predetermined lower body movement, or a combination thereof, and the activating command may be generated when the hand gesture, the hand movement, or the lower body movement of the user tracked by the tracking unit meets the predetermined hand gesture, the predetermined hand movement, or the predetermined lower body movement.

Afterwards, in steps S4 and S5, the processing unit 13 generates the switching command in response to the activating command to indicate the display unit 12 to switch from the first-person perspective mode to the third-person perspective mode in response to the switching command, so as to, for example, help the user to get away from the stopping state or the stuck state of the avatar played by the user, or to understand a current position or a current state of the avatar played by the user in the virtual environment, which significantly enhances user experience. In detail, when the display unit 12 displays the scene of the virtual environment in the third-person perspective mode, the virtual camera is moved to a position other than the eye position of the avatar. For example, the virtual camera can be located right above the avatar for providing a God's eye view, or behind the avatar, so as to capture images of the avatar and the virtual environment nearby.

Understandably, when the display unit 12 displays the scene in the third-person perspective mode, a viewpoint of the third-person perspective mode is adjustable according to the user's demand. For example, in another embodiment, the processing unit can further adjust the view point of the third-person perspective mode. Therefore, the user is allowed to move the viewpoint of the third-person perspective mode freely to see a whole picture. Furthermore, if the aforementioned state of the avatar no longer exists, the display unit can switch from the third-person perspective mode to the first-person perspective mode for enhancing the immersive experience.

Figure 4:
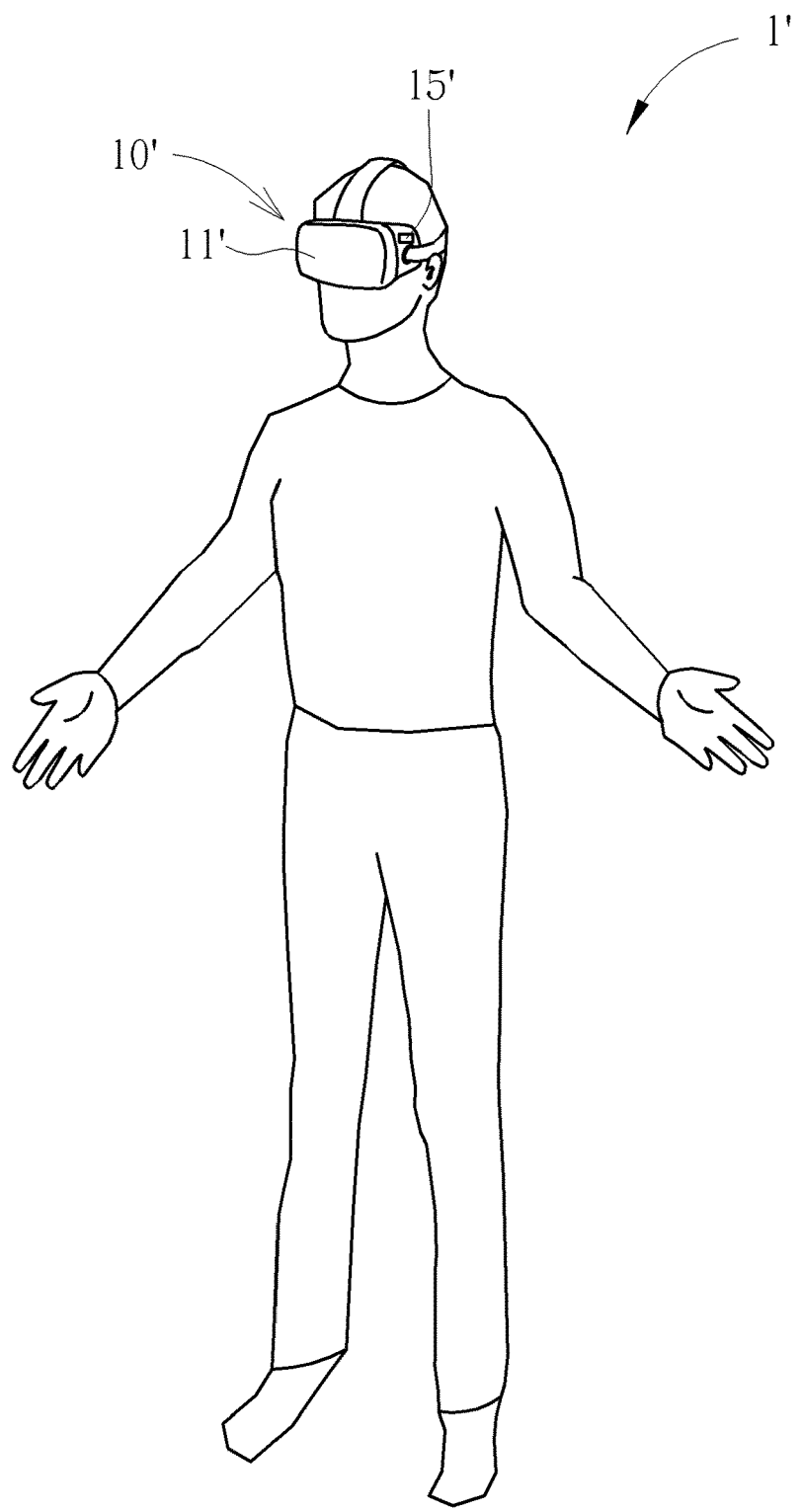
FIG. 4 is a diagram of a head mounted display system according to a second embodiment of the present disclosure.
Figure 5:
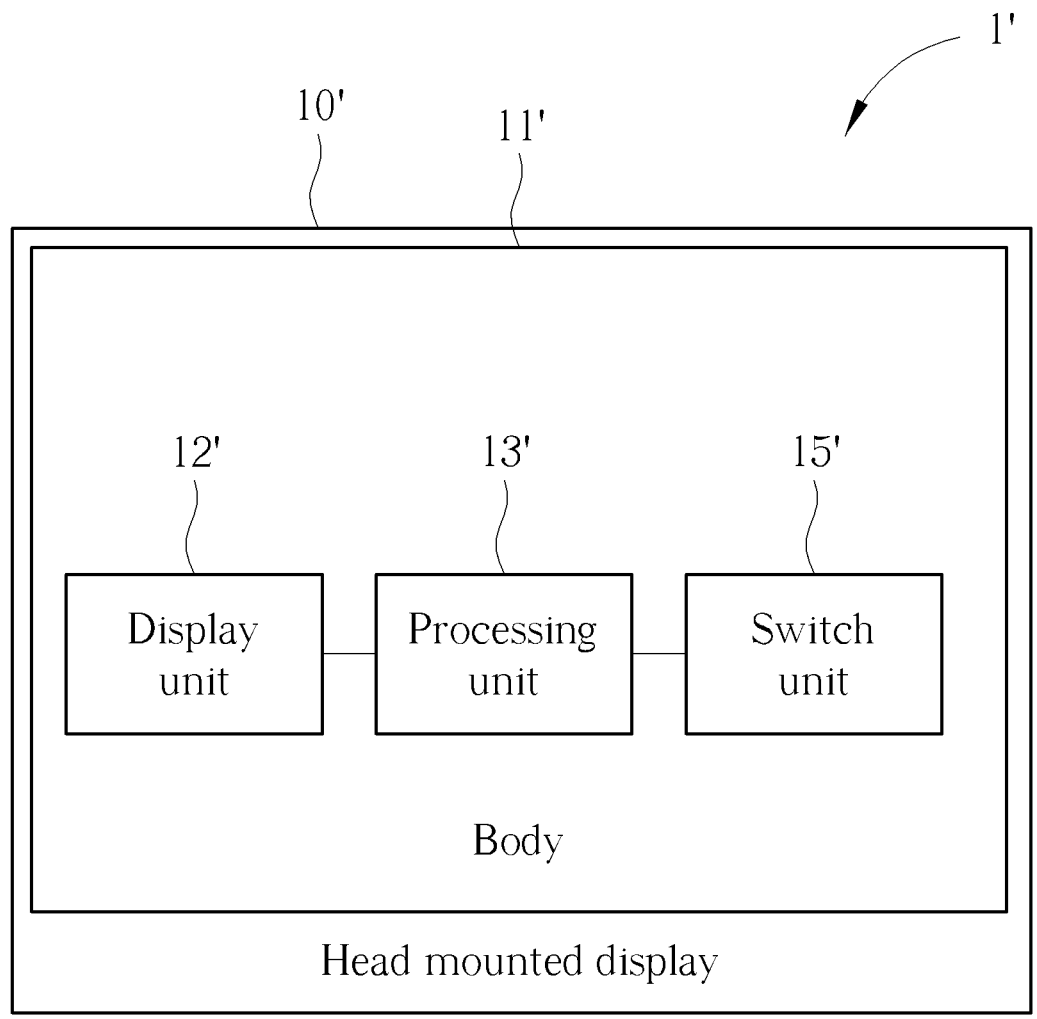
FIG. 5 is a functional block diagram of the head mounted display system according to the second embodiment of the present disclosure.
Figure 6:
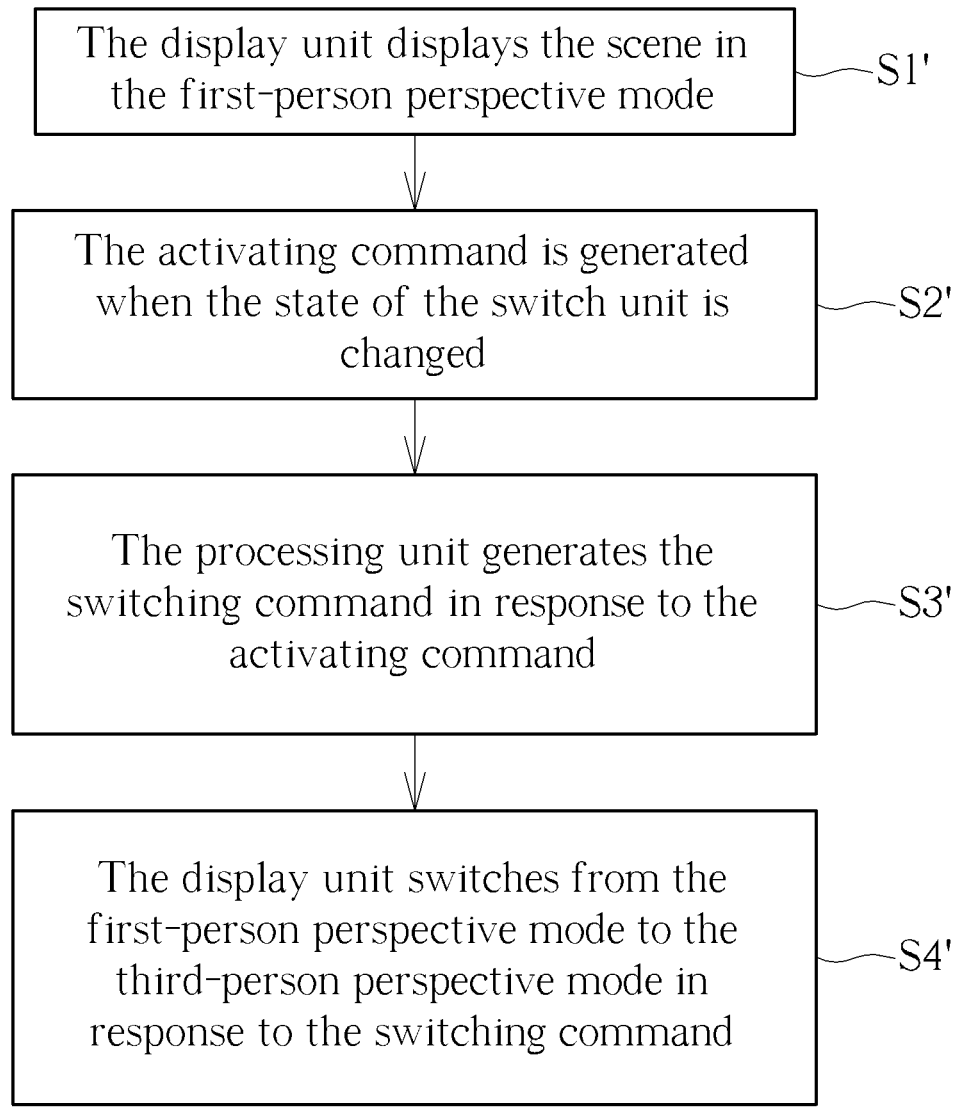
FIG. 6 is a flow chart diagram illustrating a method of switching the head mounted display system between a first-person perspective mode and a third-person perspective mode according to the second embodiment of the present disclosure.

Please refer to FIG. 4 to FIG. 6. FIG. 4 is a diagram of a head mounted display system 1' according to a second embodiment of the present disclosure. FIG. 5 is a functional block diagram of the head mounted display system 1' according to the second embodiment of the present disclosure. FIG. 6 is a flow chart diagram illustrating a method of switching the head mounted display system 1' between a first-person perspective mode and a third-person perspective mode according to the second embodiment of the present disclosure. As shown in FIG. 4 to FIG. 6, different from the head mounted display system 1 of the first embodiment, the head mounted display system 1' of this embodiment includes a wearable body 11', a display unit 12', a processing unit 13' and a switch unit 15'. The display unit 12' is disposed on the wearable body 11'. The processing unit 13' is disposed on the wearable body 11' and coupled to the display unit 12'. The switch unit 15' is disposed on the wearable body 11' and coupled to the processing unit 13' for generating the activating command when a state of the switch unit 15' is changed. In other words, in this embodiment, the user can switch the display unit 12' from the first-person perspective mode to the third-person perspective mode by changing the state of the switch unit 15' according to practical demands. Furthermore, understandably, the user can switch the display unit 12' from the third-person perspective mode to the first-person perspective mode by pressing or clicking the switch unit 15' again. Besides, in this embodiment, the switch unit 15' can be a physical button on the wearable body 11', and the state of the switch unit 15' can be changed by pressing or clicking. However, the present disclosure is not limited thereto. In another embodiment, the switch unit also can be a virtual button on the wearable body or displayed by the display unit and be activated or deactivated by touch operation.

Figure 7:
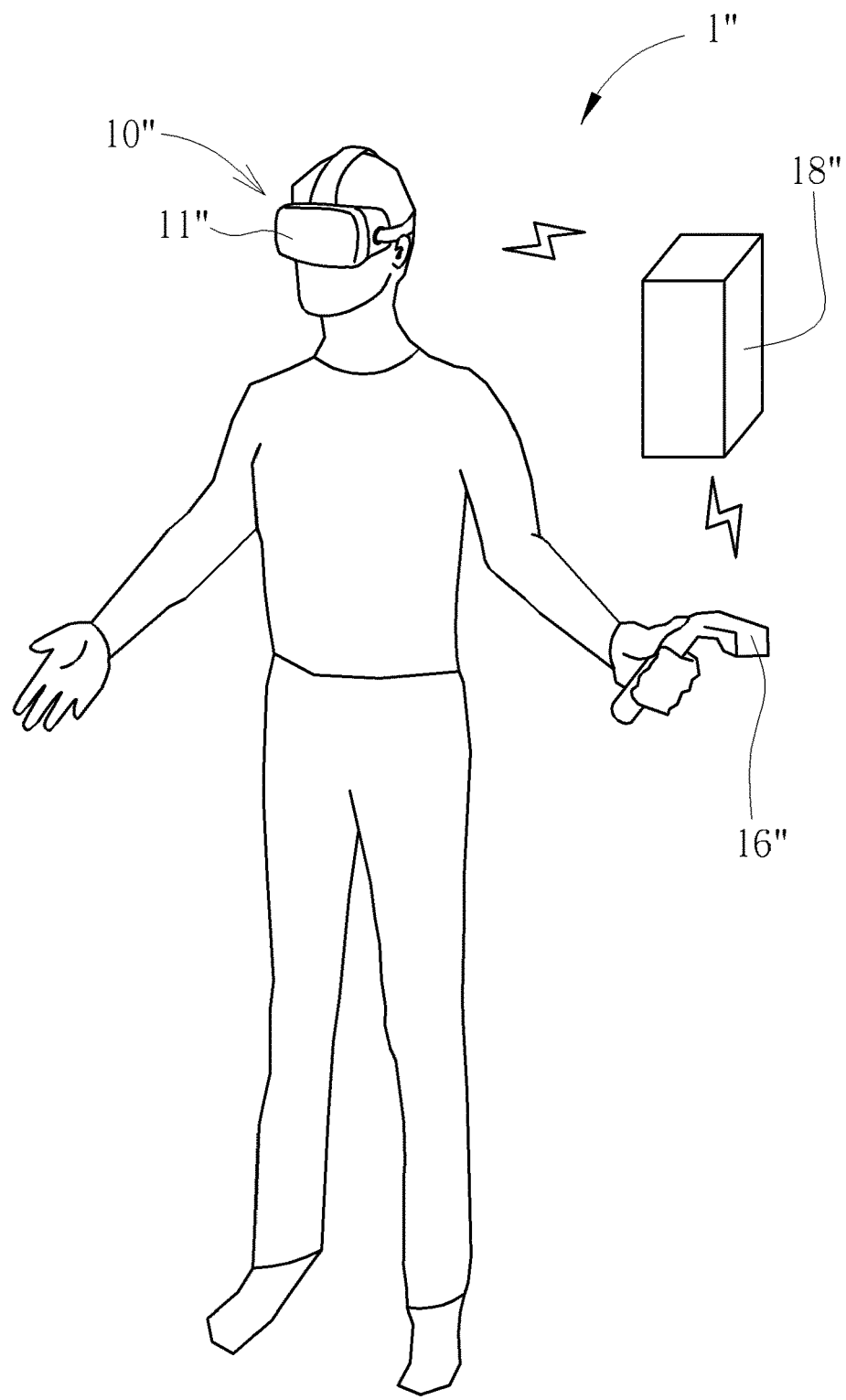
FIG. 7 is a diagram of a head mounted display system according to a third embodiment of the present disclosure.
Figure 8:
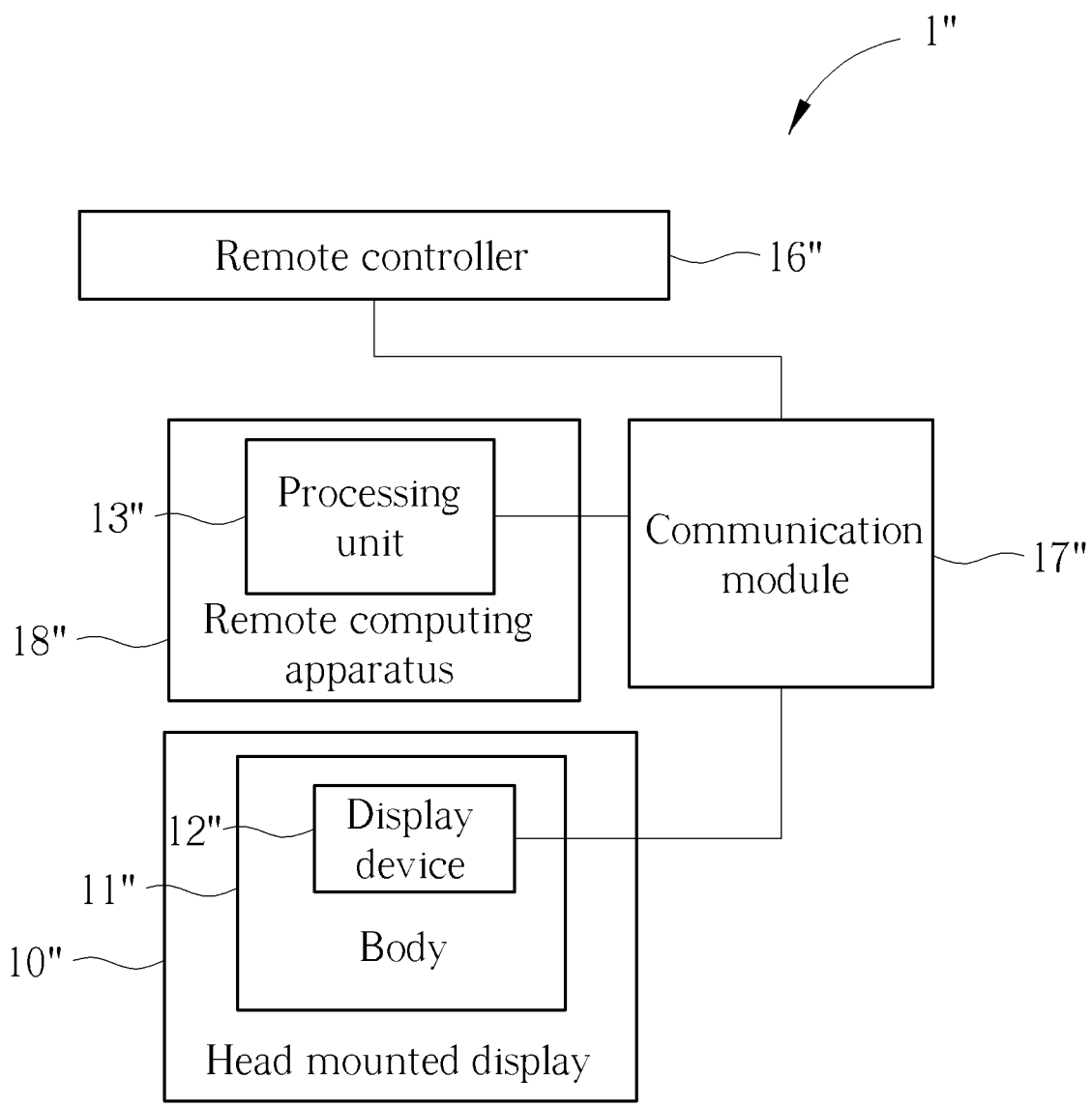
FIG. 8 is a functional block diagram of the head mounted display system according to the third embodiment of the present disclosure.
Figure 9:
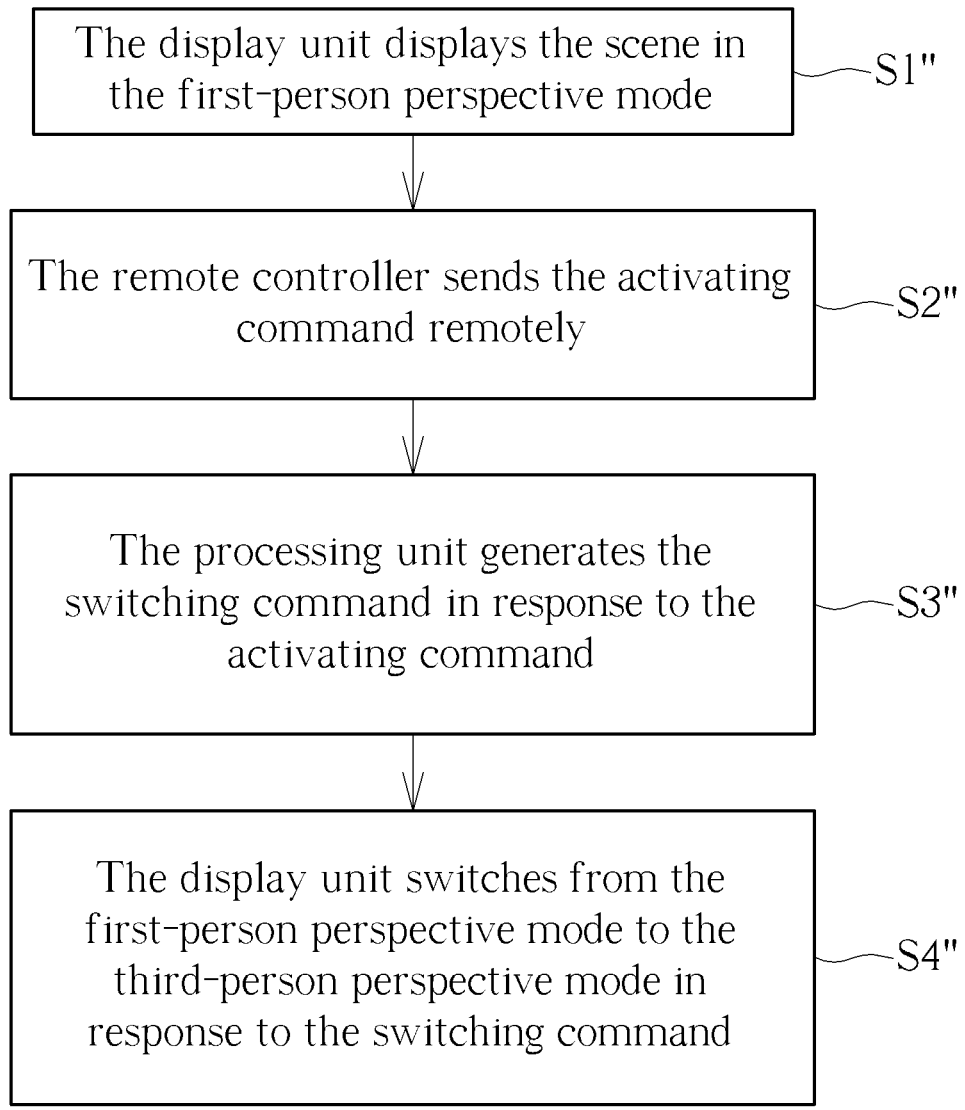
FIG. 9 is a flow chart diagram illustrating a method of switching the head mounted display system between a first-person perspective mode and a third-person perspective mode according to the third embodiment of the present disclosure.

Please refer to FIG. 7 to FIG. 9. FIG. 7 is a diagram of a head mounted display system 1" according to a third embodiment of the present disclosure. FIG. 8 is a functional block diagram of the head mounted display system 1" according to the third embodiment of the present disclosure. FIG. 9 is a flow chart diagram illustrating a method of switching the head mounted display system 1" between a first-person perspective mode and a third-person perspective mode according to the third embodiment of the present disclosure. As shown in FIG. 7 to FIG. 9, different from the head mounted display systems 1, 1' of the aforementioned embodiments, the head mounted display system 1" of this embodiment includes a wearable body 11", a display unit 12" mounted on the wearable body, a processing unit 13", a remote controller 16", a communication module 17" and a remote computing apparatus 18". The processing unit 13" is disposed on the remote computing apparatus 18". The communication module 17" constructs a communication channel among the processing unit 13" on the remote computing apparatus 18", the display unit 12" disposed on the wearable body 11" and the remote controller 16". In other words, the processing unit 13" is coupled to the display unit 12" by the communication module 17" for indicating the display unit 12" to switch between the first-person perspective mode and the third-person perspective mode, and the remote controller 16" is coupled to and communicated with the processing unit 13" by the communication module 17" for generating the activating command when the remote controller 16" is operated and transmit the activating command remotely by the communication module 17" when the activating command is generated. In other words, in this embodiment, the user can switch the display unit 12' from the first-person perspective mode to the third-person perspective mode by sending the activating command with the remote controller 19'" according to practical demands. Furthermore, understandably, the user can switch the display unit 12' from the third-person perspective mode to the first-person perspective mode by operating the remote controller 16".

Figure 10:
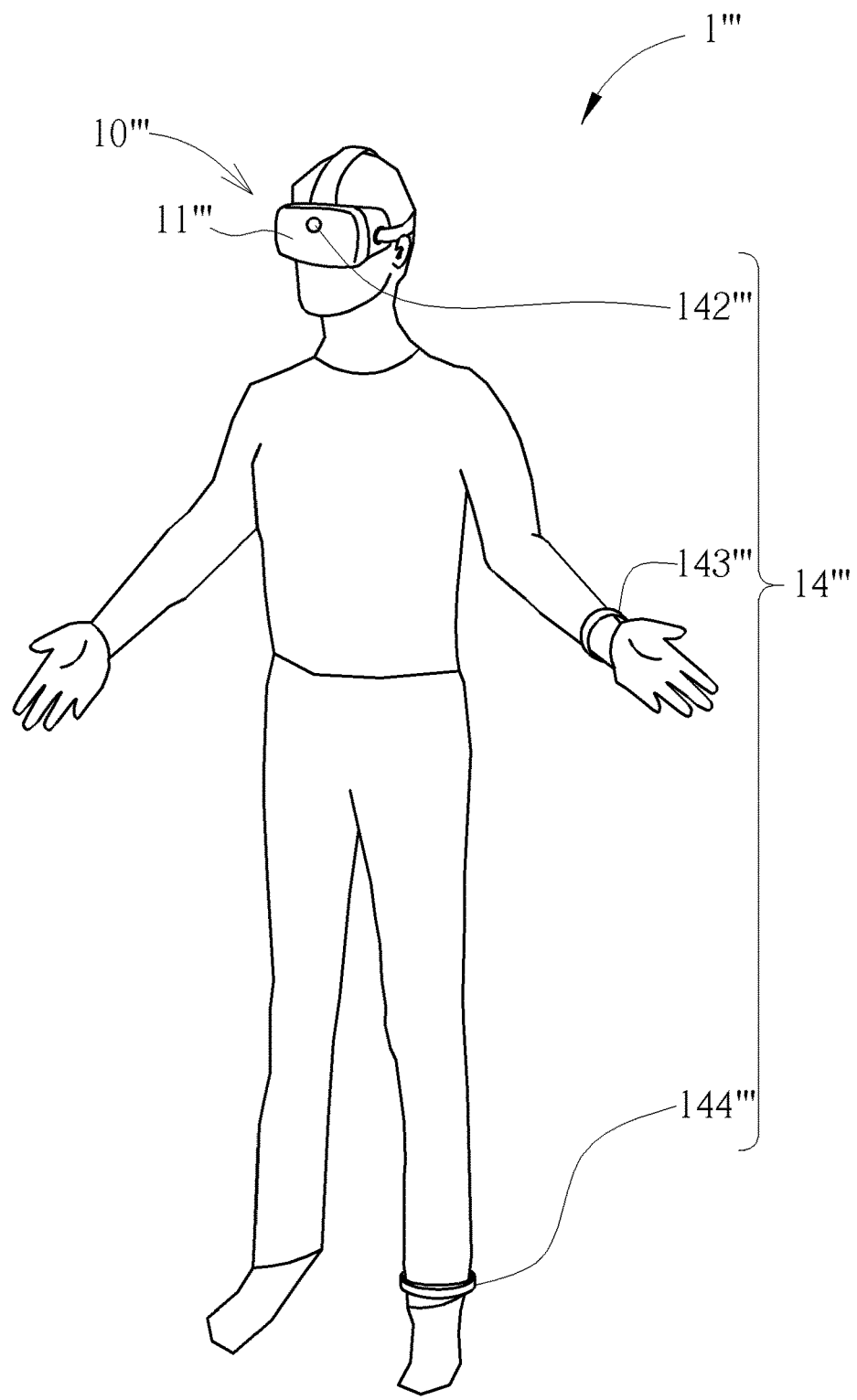
FIG. 10 is a diagram of a head mounted display system according to a fourth embodiment of the present disclosure.
Figure 11:
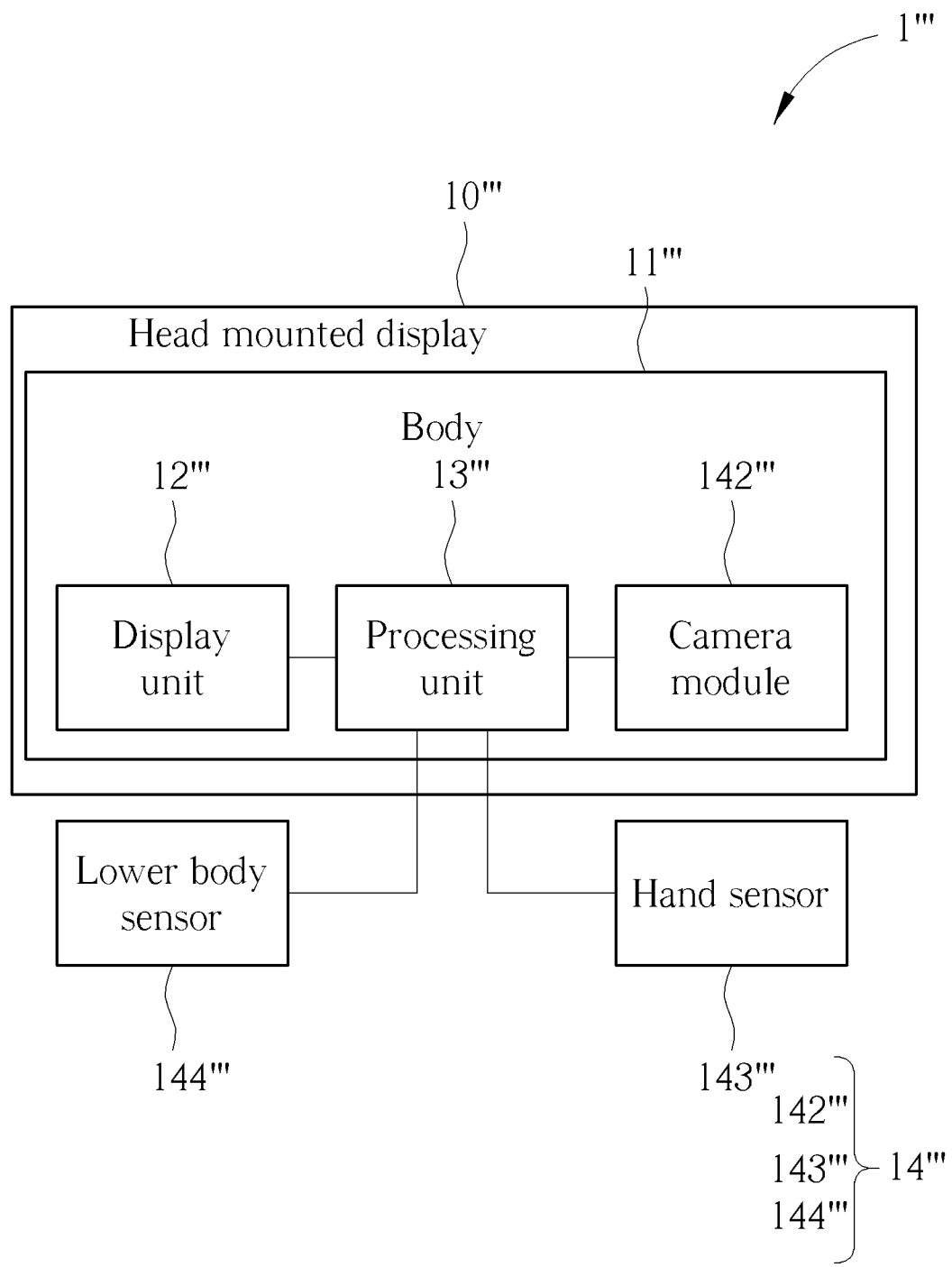
FIG. 11 is a functional block diagram of the head mounted display system according to the fourth embodiment of the present disclosure.
Figure 12:
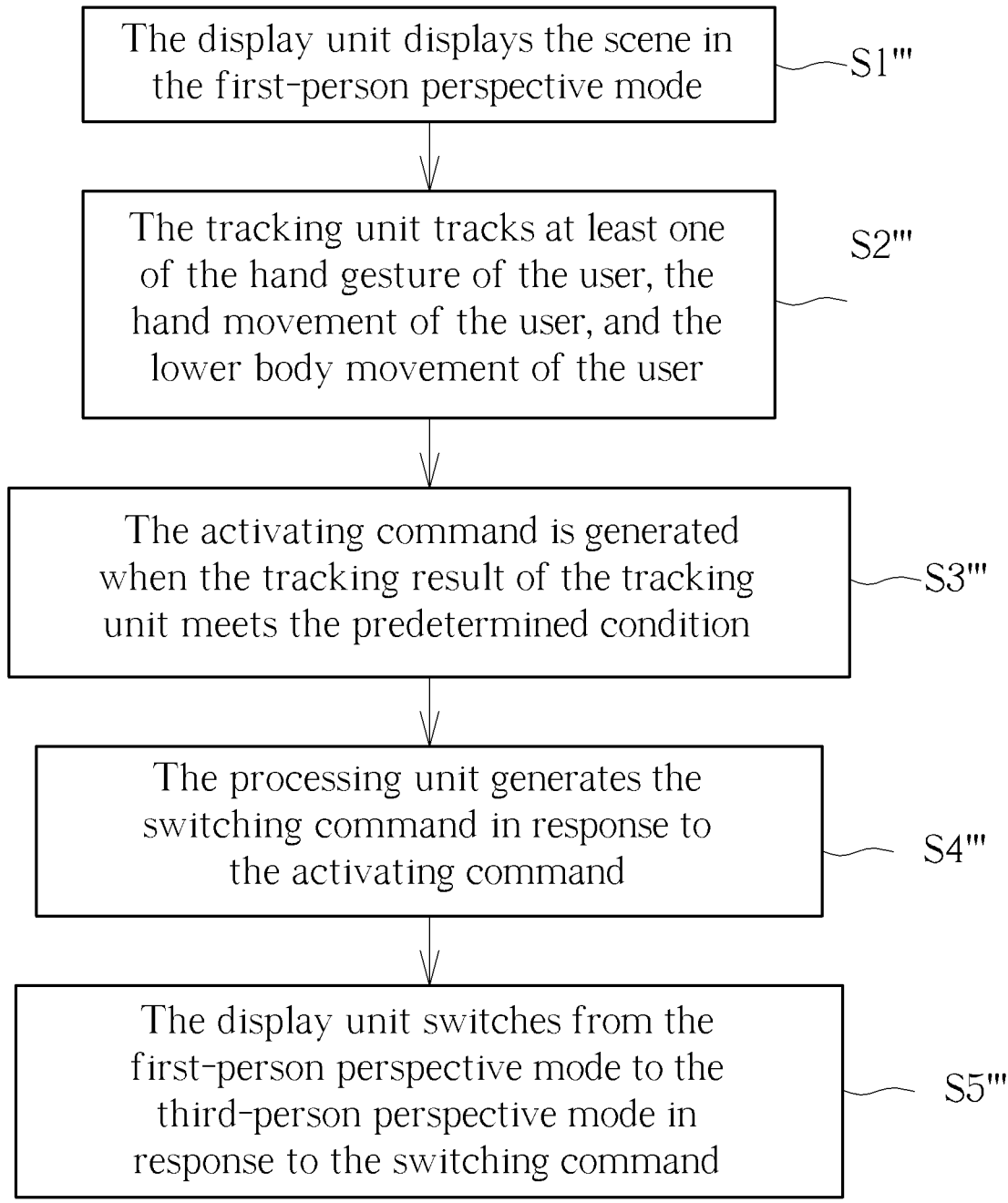
FIG. 12 is a flow chart diagram illustrating a method of switching the head mounted display system between a first-person perspective mode and a third-person perspective mode according to the fourth embodiment of the present disclosure.

Please refer to FIG. 10 to FIG. 12. FIG. 10 is a diagram of a head mounted display system 1' according to a fourth embodiment of the present disclosure. FIG. 11 is a functional block diagram of the head mounted display system 1' according to the fourth embodiment of the present disclosure. FIG. 12 is a flow chart diagram illustrating a method of switching the head mounted display system 1' between a first-person perspective mode and a third-person perspective mode according to the fourth embodiment of the present disclosure. As shown in FIG. 10 to FIG. 12, different from the head mounted display system 1, 1', 1" of the aforementioned embodiments, the head mounted display system 1'" of this embodiment includes a wearable body 11', a display unit 12', a processing unit 13' and a tracking unit 14'. The display unit 12' and the processing unit 13' are disposed on the wearable body 11'". The processing unit 13'" is coupled to the display unit 12'''. The tracking unit 14''' includes a camera module 142''' coupled to the processing unit 13''' and disposed on the wearable body 11''', a hand sensor 143''' coupled to the processing unit 13''' and worn on the hand of the user, a lower body sensor 144''' coupled to the processing unit 13''' and worn on the lower body of the user for tracking at least one of the hand gesture of the user, the hand movement of the user and the lower body movement of the user, and the predetermined condition may be the predetermined hand gesture, the predetermined hand movement, the predetermined lower body movement, or a combination thereof. For example, the activating command may be generated when the hand gesture, the hand movement or the lower body movement of the user tracked by the tracking unit meets the predetermined hand gesture, the predetermined hand movement, or the predetermined lower body movement. However, the present disclosure is not limited thereto. In another embodiment, the tracking unit may include at least one of the camera module 142''', the hand sensor 143''' and the lower body sensor 144'''.

Furthermore, the above-described embodiments of the present disclosure can be implemented in software, firmware, hardware configuration, or combination thereof, and it is also possible to provide a non-transitory computer readable storage medium for storing a program that causes a head mounted display system to execute a process by a processor in accordance with the above-described methods of the present disclosure. The processor can be a central processing unit, an application processor, a microprocessor, etc., or may be realized by an application specific integrated circuit (ASIC). The computer-readable recording medium can be a Read-Only Memory (ROM), a random-access memory (RAM), a CD-ROM, a magnetic tape, a floppy disk, or an optical data storage device. However, the present disclosure is not limited thereto.

In contrast to the prior art, the present disclosure utilizes the processing unit for generating the switching command in response to the activating command to indicate the display unit to switch between the first-person perspective mode and the third-person perspective mode. Therefore, it allows the user to switch the display unit between the first-person perspective mode and the third-person perspective mode by different ways to, for example, help the user to get away from a stopping state or a stuck state of the avatar played by the user, or to understand the current position or the current state of the avatar played by the user in the virtual environment, which significantly enhances user experience.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A head mounted display system comprising:
a wearable body configured to be worn by a user;
a display unit mounted on the wearable body and configured to display a scene in a first-person perspective mode or in a third-person perspective mode;
a processing unit coupled to the display unit and configured to generate a switching command in response to an activating command, wherein the switching command indicates the display unit to switch from the first-person perspective mode to the third-person perspective mode, or to switch from the third-person perspective mode to the first-person perspective mode; and a tracking unit coupled to the processing unit and configured to track at least one of a position, a pose, and an orientation of the head mounted display system in a real environment, wherein the processing unit is configured to compute at least one of a corresponding position, a corresponding pose, and a corresponding orientation of the head mounted display system in a virtual environment according to the at least one of the position, the pose, and the orientation of the head mounted display system in the real environment and further to compute at least one of a position, a pose, and an orientation of an avatar in the virtual environment according to the at least one of the position, the pose, and the orientation of the head mounted display system in the real environment, the activating command is generated when a predetermined condition is met, and the predetermined condition is determined to be met when at least one difference between the at least one of the corresponding position, the corresponding pose and the corresponding orientation of the head mounted display system in the virtual environment and the at least one of the position, the pose and the orientation of the avatar in the virtual environment is greater than at least one predetermined difference.

2. The head mounted display system of claim 1, further comprising:
a switch unit coupled to the processing unit and for generating the activating command when a state of the switch unit is changed.

3. The head mounted display system of claim 1, further comprising:
a remote controller communicated with the processing unit for generating the activating command.

4. The head mounted display system of claim 1, wherein the tracking unit is configured to further track at least one of a hand gesture of the user, a hand movement of the user and a lower body movement of the user, and the activating command is generated when the predetermined condition is met.

5. The head mounted display system of claim 1, wherein display information of the display unit is used to determine whether to determine the predetermined condition is met.

6. The head mounted display system of claim 1, further comprising:
a remote computing apparatus not disposed on the wearable body; and
a communication module disposed on the wearable body for constructing a communication channel to the remote computing apparatus.

7. The head mounted display system of claim 6, wherein the processing unit is at least partly disposed on the remote computing apparatus.

8. The head mounted display system of claim 1, wherein a reference point in the virtual environment is determined when the tracking unit starts tracking the at least one of the position, the pose, and the orientation of the head mounted display system in the real environment, the corresponding position, the corresponding pose and the corresponding orientation of the head mounted display system in the virtual environment are respectively referred to a position, a pose and an orientation of a virtual camera in the virtual environment, at least one of the position, the pose and the orientation of the virtual camera in the virtual environment is computed according to the reference point in the virtual environment and according to an variation of the at least one of the position, the pose and the orientation of the head mounted display system in the real environment, the at least one of the position, the pose and the orientation of the avatar in the virtual environment is computed according to the reference point in the virtual environment, the variation of the at least one of the position, the pose and the orientation of the head mounted display system in the real environment, and an environmental condition of the virtual environment, the predetermined condition is determined to be met when at least one difference between the at least one of the position, the pose and the orientation of the virtual camera in the virtual environment and the at least one of the position, the pose and the orientation of the avatar in the virtual environment is greater than at least another one predetermined difference.

9. A method of switching a head mounted display system between a first-person perspective mode and a third-person perspective mode, the method comprising:
  utilizing a display unit of the head mounted display system to display a scene in the first-person perspective mode or in the third-person perspective mode;
  utilizing a processing unit of the head mounted display system to generate a switching command in response to an activating command to indicate the display unit to switch from the first-person perspective mode to the third-person perspective mode, or to switch from the third-person perspective mode to the first-person perspective mode;
  utilizing a tracking unit of the head mounted display system to track at least one of a position, a pose, and an orientation of the head mounted display system in a real environment; and
  utilizing the processing unit to compute at least one of a corresponding position, a corresponding pose, and a corresponding orientation of the head mounted display system in a virtual environment according to the at least one of the position, the pose, and the orientation of the head mounted display system in the real environment and further to compute at least one of a position, a pose, and an orientation of an avatar in the virtual environment according to the at least one of the position, the pose, and the orientation of the head mounted display system in the real environment, wherein the activating command is generated when a predetermined condition is met, and the predetermined condition is determined to be met when at least one difference between the at least one of the corresponding position, the corresponding pose and the corresponding orientation of the head mounted display system in the virtual environment and the at least one of the position, the pose and the orientation of the avatar in the virtual environment is greater than at least one predetermined difference.

10. The method of claim 9, further comprising:
  utilizing a switch unit of the head mounted display system to generate the activating command when a state of the switch unit is changed.

11. The method of claim 9, further comprising:
  utilizing a remote controller of the head mounted display system to generate the activating command when the remote controller is operated.

12. The method of claim 9, further comprising:
  utilizing the tracking unit of the head mounted display system to further track at least one of a hand gesture of a user, a hand movement of the user and a lower body movement of the user; and
  generating the activating command when the predetermined condition is met.

13. The method of claim 9, further comprising:
  determining whether to determine the predetermined condition is met according to display information of the display unit.

14. The method of claim 9, wherein a reference point in the virtual environment is determined when the tracking unit starts tracking the at least one of the position, the pose, and the orientation of the head mounted display system in the real environment, the corresponding position, the corresponding pose and the corresponding orientation of the head mounted display system in the virtual environment are respectively referred to a position, a pose and an orientation of a virtual camera in the virtual environment, and utilizing the processing unit to compute the at least one of the corresponding position, the corresponding pose, and the corresponding orientation of the head mounted display system in the virtual environment according to the at least one of the position, the pose, and the orientation of the head mounted display system in the real environment and further to compute the at least one of the position, the pose, and the orientation of the avatar in the virtual environment according to the at least one of the position, the pose, and the orientation of the head mounted display system in the real environment comprises:
  utilizing the processing unit to compute the at least one of the position, the pose and the orientation of the virtual camera in the virtual environment according to the reference point in the virtual environment and according to an variation of the at least one of the position, the pose and the orientation of the head mounted display system in the real environment; and
  utilizing the processing unit to compute the at least one of the position, the pose and the orientation of the avatar in the virtual environment according to the reference point in the virtual environment, the variation of the at least one of the position, the pose and the orientation of the head mounted display system in the real environment, and an environmental condition of the virtual environment.

15. A non-transitory computer readable storage medium storing a program that causes a head mounted display system to execute a process, the process comprising:
  utilizing a display unit of the head mounted display system to display a scene in a first-person perspective mode or in a third-person perspective mode;
  utilizing a processing unit of the head mounted display system to generate a switching command in response to an activating command to indicate the display unit to switch from the first-person perspective mode to the third-person perspective mode, or to switch from the third-person perspective mode to the first-person perspective mode;
  utilizing a tracking unit of the head mounted display system to track at least one of a position, a pose, and an orientation of the head mounted display system in a real environment; and
  utilizing the processing unit to compute at least one of a corresponding position, a corresponding pose, and a corresponding orientation of the head mounted display system in a virtual environment according to the at least one of the position, the pose, and the orientation of the head mounted display system in the real environment and further to compute at least one of a position, a pose, and an orientation of an avatar in the virtual environment according to the at least one of the position, the pose, and the orientation of the head mounted display system in the real environment, wherein the activating command is generated when a predetermined condition is met, and the predetermined condition is determined to be met when at least one difference between the at least one of the corresponding position, the corresponding pose and the corresponding orientation of the head mounted display system in the virtual environment and the at least one of the position, the pose and the orientation of the avatar in the virtual environment is greater than at least one predetermined difference.

16. The non-transitory computer readable storage medium of claim 15, wherein the process further comprises:
utilizing a switch unit of the head mounted display system to generate the activating command when a state of the switch unit is changed.

17. The non-transitory computer readable storage medium of claim 15, wherein the process further comprises:
utilizing a remote controller of the head mounted display system to generate the activating command when the remote controller is operated.

18. The non-transitory computer readable storage medium of claim 15, wherein the process further comprises:
utilizing the tracking unit of the head mounted display system to further track at least one of a hand gesture of a user, a hand movement of the user and a lower body movement of the user; and
generating the activating command when the predetermined condition is met.

19. The non-transitory computer readable storage medium of claim 15, wherein the process further comprises:
determining whether to determine the predetermined condition is met according to display information of the display.

20. The non-transitory computer readable storage medium of claim 15, wherein a reference point in the virtual environment is determined when the tracking unit starts tracking the at least one of the position, the pose, and the orientation of the head mounted display system in the real environment, the corresponding position, the corresponding pose and the corresponding orientation of the head mounted display system in the virtual environment are respectively referred to a position, a pose and an orientation of a virtual camera in the virtual environment, and utilizing the processing unit to compute the at least one of the corresponding position, the corresponding pose, and the corresponding orientation of the head mounted display system in the virtual environment according to the at least one of the position, the pose, and the orientation of the head mounted display system in the real environment and further to compute the at least one of the position, the pose, and the orientation of the avatar in the virtual environment according to the at least one of the position, the pose, and the orientation of the head mounted display system in the real environment comprises:
utilizing the processing unit to compute the at least one of the position, the pose and the orientation of the virtual camera in the virtual environment according to the reference point in the virtual environment and according to an variation of the at least one of the position, the pose and the orientation of the head mounted display system in the real environment; and
utilizing the processing unit to compute the at least one of the position, the pose and the orientation of the avatar in the virtual environment according to the reference point in the virtual environment, the variation of the at least one of the position, the pose and the orientation of the head mounted display system in the real environment, and an environmental condition of the virtual environment.

* * * * *